United States Patent
Gabbey (10) Patent No.: US 12,498,398 B2
(45) Date of Patent: Dec. 16, 2025

(54) ELECTRICAL TESTING DEVICE WITH PROBE HAVING AN ADJUSTABLE ANGLE

(71) Applicant: Snap-on Incorporated, Kenosha, WI (US)

(72) Inventor: Nicholas A. Gabbey, Mount Pleasant, WI (US)

(*) Notice: Subject to any disclaimer, the term of this patent is extended or adjusted under 35 U.S.C. 154(b) by 339 days.

(21) Appl. No.: 18/113,609

(22) Filed: Feb. 23, 2023

(65) Prior Publication Data
US 2024/0288473 A1    Aug. 29, 2024

(51) Int. Cl.
*G01R 31/66* (2020.01)
*G01R 1/067* (2006.01)
*G01R 1/073* (2006.01)

(52) U.S. Cl.
CPC ..... *G01R 1/07357* (2013.01); *G01R 1/06705* (2013.01); *G01R 31/66* (2020.01)

(58) Field of Classification Search
CPC . G01R 1/07357; G01R 1/06705; G01R 31/66
USPC .......... 324/500, 600, 76.11, 750.22
See application file for complete search history.

(56) References Cited

U.S. PATENT DOCUMENTS

| | | |
|---|---|---|
| 2,623,925 A | 12/1952 | Schaefer |
| 4,949,274 A | 8/1990 | Hollander et al. |
| 5,512,839 A | 4/1996 | De Monaco |
| 5,672,964 A | 9/1997 | Vinci |
| 5,867,019 A | 2/1999 | Malenko et al. |
| 6,356,853 B1 * | 3/2002 | Sullivan ............. G01R 31/50 324/537 |
| 6,512,361 B1 | 1/2003 | Becker |
| 6,518,780 B1 | 2/2003 | Campbell et al. |
| 6,650,131 B2 | 11/2003 | Campbell et al. |
| 6,704,670 B2 | 3/2004 | McTigue |
| 6,863,576 B2 | 3/2005 | Campbell et al. |
| 6,888,341 B2 | 5/2005 | Johnson et al. |
| 6,956,389 B1 | 10/2005 | Mai |

(Continued)

FOREIGN PATENT DOCUMENTS

| CN | 203337694 U | 12/2013 |
|---|---|---|
| EP | 3130928 A1 | 2/2017 |

(Continued)

OTHER PUBLICATIONS

Everett Charles, "Step Probes", retrieved at https://ect-cpg.com/step-probes on Oct. 20, 2022.

(Continued)

*Primary Examiner* — Giovanni Astacio-Oquendo
*Assistant Examiner* — Trung Q Nguyen
(74) *Attorney, Agent, or Firm* — McDonnell Boehnen Hulbert & Berghoff LLP (57) ABSTRACT

A device for testing a voltage level in an electrical terminal cavity having a testing body and a test lead for insertion into the electrical terminal cavity. The test lead includes a non-flexible portion configured to be attached to the testing body, a non-flexible probe configured to be inserted into the electrical terminal cavity, and a flexible connector extending between the non-flexible portion and the non-flexible probe such that the flexible connector has two or more links, each able to articulate in a plurality of directions. The device also includes a circuit operatively coupled with the probe to sense the voltage level in the electrical terminal cavity.

20 Claims, 7 Drawing Sheets

(56) References Cited

U.S. PATENT DOCUMENTS

| | | | |
|---|---|---|---|
| 7,061,262 B2 | 6/2006 | Mai | |
| 7,090,637 B2 * | 8/2006 | Danitz | A61B 34/77 |
| | | | 600/141 |
| 7,221,179 B1 | 5/2007 | Campbell | |
| 7,492,177 B1 | 2/2009 | Campbell | |
| 8,832,933 B2 | 9/2014 | Kuo et al. | |
| 9,157,931 B2 | 10/2015 | Okada et al. | |
| 9,417,263 B2 | 8/2016 | Kuo et al. | |
| 9,791,473 B2 | 10/2017 | Nie | |
| 9,823,273 B2 | 11/2017 | Martin et al. | |
| 10,060,981 B2 * | 8/2018 | Barden | G01R 31/54 |
| D830,866 S | 10/2018 | Brekke et al. | |
| 10,168,356 B2 | 1/2019 | Campbell et al. | |
| 10,228,390 B2 | 3/2019 | McGrath, Jr. et al. | |
| 10,302,676 B2 | 5/2019 | Mende et al. | |
| 10,309,987 B2 | 6/2019 | Kim et al. | |
| 10,852,322 B1 | 12/2020 | Rosas et al. | |
| 11,187,723 B2 | 11/2021 | Kunze et al. | |
| 11,268,981 B2 | 3/2022 | Treibergs et al. | |
| 11,293,947 B2 | 4/2022 | Selvaraj et al. | |
| 11,307,222 B2 | 4/2022 | Morgana | |
| 11,656,281 B2 * | 5/2023 | Frymyer, Jr. | G01R 1/07364 |
| | | | 324/426 |
| 2004/0236316 A1 | 11/2004 | Danitz et al. | |
| 2006/0033521 A1 | 2/2006 | Mai | |
| 2006/0043959 A1 | 3/2006 | Cavoretto | |
| 2006/0209483 A1 | 9/2006 | Hurwicz | |
| 2009/0189597 A1 | 7/2009 | Lagerberg et al. | |
| 2011/0184241 A1 * | 7/2011 | Zubiate | B25J 9/104 |
| | | | 600/141 |
| 2012/0098562 A1 | 4/2012 | Tan | |
| 2012/0153980 A1 | 6/2012 | Wu | |
| 2017/0271826 A1 | 9/2017 | Mende et al. | |
| 2017/0288357 A1 | 10/2017 | Price | |
| 2018/0267083 A1 | 9/2018 | Wei et al. | |
| 2019/0227099 A1 | 7/2019 | Chen et al. | |
| 2021/0405088 A1 * | 12/2021 | Pham | G01R 15/186 |
| 2022/0099733 A1 * | 3/2022 | Barabi | G01R 31/2891 |
| 2022/0196744 A1 * | 6/2022 | Frymyer, Jr. | G01R 1/06788 |
| 2022/0326280 A1 | 10/2022 | Hock et al. | |

FOREIGN PATENT DOCUMENTS

| | | |
|---|---|---|
| EP | 4075149 A2 | 10/2022 |
| KR | 20090050772 A | 5/2009 |
| TW | I606240 B | 11/2017 |
| TW | I639836 B | 11/2018 |
| TW | I713939 B | 12/2020 |
| WO | WO0210675 A1 | 2/2002 |
| WO | WO18112166 A1 | 6/2018 |
| WO | WO19120961 A1 | 6/2019 |

OTHER PUBLICATIONS

Dynometer, "Dynamoter Jointed Test Finger for Household Electrical Product", Retrieved at https://www.alibaba.com/product-detail/Dynamometer-Jointed-Test-Finger-For-Household_60232452953.html on Oct. 20, 2022.

Bonad "Articulated Finger Probe for Safety Test Probe Standard Test Finger Product", Retrieved at https://www.alibaba.com/product-detail/Articulated-finger-probe-for-safety-test_60142635414.html on Oct. 20, 2022.

Honas, "ul100 hinge jointed test finger probe product", Retrieved at https://www.aliexpress.us/item/3256803525751516.html?gatewayAdapt=glo2usa4itemAdapt&_randl_shipto=US on Oct. 20, 2022.

* cited by examiner

CONTACTING THE ELECTRICAL TERMINAL CAVITY WITH THE DEVICE

602 detecting, via the device, the voltage level in the electrical terminal cavity

604 displaying, via a user interface on the device, a measurement of the voltage level of the electrical terminal cavity

ELECTRICAL TESTING DEVICE WITH PROBE HAVING AN ADJUSTABLE ANGLE

BACKGROUND

Electrical testing devices, such as a handheld electrical testing device, is often used to measure electrical voltage, current (amperage), resistance, and other values. Examples of electrical testing devices are a multimeter, a volt-ohm meter, a multitester, a voltmeter, an ammeter, an ohmmeter, or the like. These electrical testing devices can include analog and digital versions and are useful for everything from simple tests, like measuring battery voltage, to detecting faults and complex diagnostics in electrical components. Electricians often use electrical testing devices for troubleshooting electrical problems on motors, appliances, circuits, power supplies, and other wiring systems by inserting appropriate probes into one or more terminals on an active circuit to measure a desired capacity of the circuit.

However, electrical testing devices, when used in tight confines, often are unable to get an accurate reading without clearing other obstructions from the testing area. Further still, in subsequent cavities that are only separated by a narrow space, even when other obstructions are cleared, traditional testing devices are bulky and can block itself from being able to achieve an accurate reading, or require an additional adaptor component to account for the obstructions.

Overview

Disclosed herein is an electrical testing device having a flexible connector. In some embodiments, the flexible connector allows for an angle or bend from 0 to 180 degrees or multiple angles and bends such that a probe of the testing device is able to get an improved measurement without having to remove other obstructions or get in its own way, as compared to electrical testing devices without a flexible connector.

One aspect of the disclosure is a device for testing a voltage level in an electrical terminal cavity having a testing body and a test lead for insertion into the electrical terminal cavity. The test lead includes a non-flexible portion configured to be attached to the testing body, a non-flexible probe configured to be inserted into the electrical terminal cavity, and a flexible connector extending between the non-flexible portion and the non-flexible probe such that the flexible connector has two or more links, where each link is able to articulate in a plurality of directions. The device also includes a circuit operatively coupled with the probe to sense the voltage level in the electrical terminal cavity.

In an embodiment of the device, the two or more links comprise a semi-rigid material.

In an embodiment of the device, the flexible connector is adjustable upon application of a force.

In an embodiment of the device, the semi-rigid material is non-conductive.

In an embodiment of the device, the flexible connector houses a flexible electrical wire electrically connecting the circuit and the non-flexible probe.

In an embodiment of the device, a contact surface of the non-flexible probe is configured to make contact with the electrical terminal cavity.

In an embodiment of the device, when engaged, the testing body conducts an electrical current.

In an embodiment of the device, the testing body is enclosed in an electrically-insulating layer.

In an embodiment of the device, the device further comprises a user interface.

In an embodiment of the device, the user interface is configured to display a measurement of the voltage level of the electrical terminal cavity.

In an embodiment of the device, the user interface is configured to display the measurement of the voltage level with at least three significant digits.

In an embodiment of the device, the device further includes a circuit protector.

In an embodiment of the device, the circuit protector comprises a fuse or a circuit breaker.

Another aspect of the disclosure is a method of using a device for testing a voltage level in an electrical terminal cavity, the method comprising contacting the electrical terminal cavity with the device such that the device includes a testing body and a test lead for insertion into the electrical terminal cavity. The test lead includes a non-flexible portion configured to be attached to the testing body, a non-flexible probe configured to be inserted into the electrical terminal cavity, and a flexible connector extending between the non-flexible portion and the non-flexible probe such that the flexible connector has two or more links, where each link is able to articulate in a plurality of directions. The device also includes a circuit operatively coupled with the probe to sense the voltage level in the electrical terminal cavity.

In an embodiment of the method, the method also includes detecting, via the device, the voltage level in the electrical terminal cavity.

In an embodiment of the method, the method also includes displaying, via a user interface on the device, a measurement of the voltage level of the electrical terminal cavity.

In an embodiment of the method, the measurement of the voltage level of the electrical terminal cavity comprises at least three significant digits.

In an embodiment of the method, the two or more links comprise a semi-rigid material.

In an embodiment of the method, the flexible connector is adjustable upon application of a force.

In an embodiment of the method, the flexible connector houses a flexible electrical wire electrically connecting the circuit within the testing body and the non-flexible probe.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

DETAILED DESCRIPTION

This description describes several example embodiments, at least some of which pertain to devices for testing a voltage level in an electrical terminal cavity, such as a device including a power source and a voltmeter, an ammeter, and/or an ohmmeter. As noted above, a need exists for a flexible connector that allows for an angle or bend from 0 to 180 degrees or multiple angles and bends such that a probe of the testing device is able to get an improved measurement without having to remove other obstructions or get in its own way, as compared to electrical testing devices without a flexible connector.

Such a device includes a testing body and a test lead for insertion into the electrical terminal cavity. The test lead includes a non-flexible portion configured to be attached to the testing body, a non-flexible probe configured to be inserted into the electrical terminal cavity, and a flexible connector extending between the non-flexible portion and the non-flexible probe such that the flexible connector has two or more links, each able to articulate in a plurality of directions. The device also includes a circuit operatively coupled with the probe to sense the voltage level in the electrical terminal cavity.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

II. Example Devices

Figure 1:
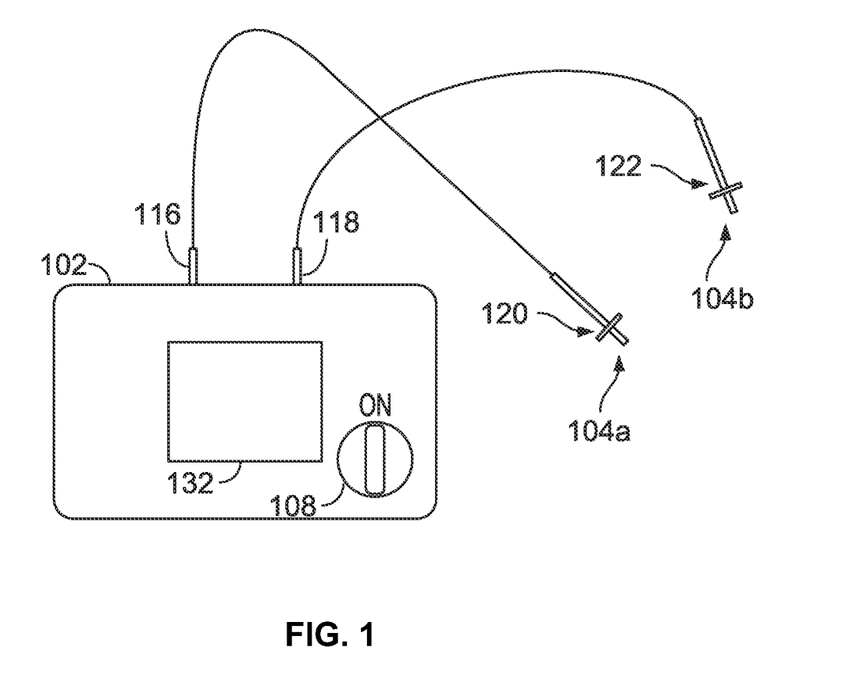
FIG. 1 is a block diagram of a device for testing a voltage level in an electrical terminal cavity, according to an example embodiment.

FIG. 1 is a schematic diagram showing a device 100 for testing a voltage level in an electrical terminal cavity. The device 100 can include any component described in FIG. 2 below. In some embodiments, the device 100 includes a testing body 102 having a power source 108, a first port 116, a second port 118, a first connection lead 120, and a second connection lead 122. Each of the first connection lead 120 and the second connection lead 122 may have a first end configured to be coupled with the first port 116 and the second port 118 and a second end configured to include a probe 104a and 104b respectively.

As such, the device 100 can be used to apply voltage to the electrical component to be tested by connecting the first port 116 to a first electrical terminal cavity using probe 104a through the first connection lead 120 (e.g., fixedly or removably) and by connecting the second port 118 to a second electrical terminal cavity using probe 104b via the second connection lead 122 (e.g., fixedly or removably). This will power the electrical component between the first electrical terminal cavity and the second terminal cavity in order to obtain a reading at the device 100.

Figure 2:
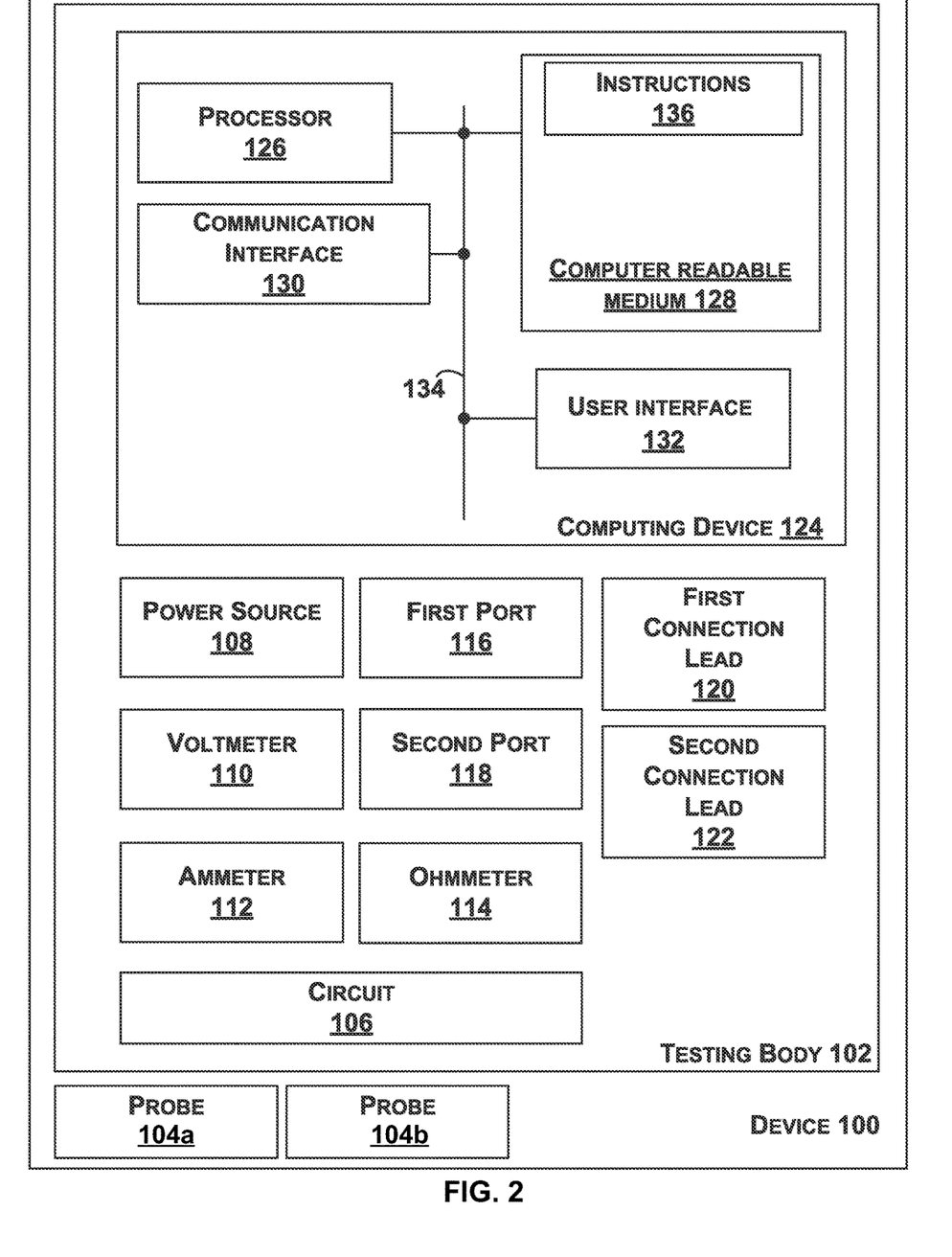
FIG. 2 is a schematic diagram showing a device for testing a voltage level in an electrical terminal cavity, according to an example embodiment.

FIG. 2 is a block diagram of the device 100 for testing a voltage level in an electrical terminal cavity. The device 100 includes a testing body 102, probes 104a and 104b for contacting the electrical terminal cavity, and a circuit 106 disposed within the testing body 102. In some embodiments, the probe 104 can have different configurations and/or geometries suitable for testing differing electrical terminal cavities, as discussed herein. Also, in some embodiments, the circuit 106 can be an analog or a digital circuit, depending on the embodiment of the device 100. As such, the circuit 106 may be disposed within the testing body 102 such that the circuit 106 is operably coupled with the probes 104 in order to sense the voltage level in the electrical terminal cavity. Although the device 100 is being used to measure voltage, in other embodiments the device may also be used to measure current (Ohm's law) or another electrical parameter. Further, although two probes are described in the embodiment above, in other embodiments the device can include only one probe or more than two probes.

In some embodiments, the testing body 102 optionally further includes a power source 108, a voltmeter 110, an ammeter 112, an ohmmeter 114, a first port 116, a second port 118, a first connection lead 120, a second connection lead 122, and/or a computing device 124. The computing device 124 can include one or more processors 126, a non-transitory computer readable medium 128, a communication interface 130, and/or a user interface 132.

Components of the computing device 124 can be linked together by a system bus, network, or other connection mechanism 134. The one or more processors 126 can be any type of processor(s), such as a microprocessor, a field programmable gate array, a digital signal processor, a multicore processor, etc., coupled to the non-transitory computer readable medium 104. The non-transitory computer readable medium 128 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 128 can store instructions 136. The instructions 136 are executable by the one or more processors 126 to cause the computing device 124 (e.g., the test device 100) to perform any of the functions or methods described herein.

The communication interface 130 can include hardware to enable communication within the computing device 124 and/or between the computing device 124 and one or more other devices. The hardware can include any type of input and/or output interfaces, a universal serial bus (USB), PCI Express, transmitters, receivers, and antennas, for example. The communication interface 130 can be configured to facilitate communication with one or more other devices, in accordance with one or more wired or wireless communication protocols. For example, the communication interface 130 can be configured to facilitate wireless data communication for the computing device 124 according to one or more wireless communication standards, such as one or more Institute of Electrical and Electronics Engineers (IEEE) 801.11 standards, ZigBee standards, Bluetooth standards, etc. As another example, the communication interface 130 can be configured to facilitate wired data communication with one or more other devices. The communication interface 106 can also include analog-to-digital converters (ADCs) or digital-to-analog converters (DACs) that the computing device 124 can use to control various components of the computing device 124 or external devices.

The user interface 132 can include any type of display component configured to display data. As one example, the user interface 132 can include a touchscreen display. As another example, the user interface 132 can include a flat-panel display, such as a liquid-crystal display (LCD) or a light-emitting diode (LED) display. The user interface 132 can include one or more pieces of hardware used to provide data and control signals to the computing device 124. For instance, the user interface 132 can include a mouse or a pointing device, a keyboard or a keypad, a microphone, a touchpad, or a touchscreen, among other possible types of user input devices. Generally, the user interface 132 can enable an operator to interact with a graphical user interface (GUI) provided by the computing device 124 (e.g., displayed by the user interface 132).

The power source 108 typically takes the form of a rechargeable battery, but other examples are possible. In some embodiments, the user interface 132 is configured to display a measurement of the voltage level of the electrical terminal cavity. In some embodiments, the user interface 132 is configured to display the measurement of the voltage level with at least three significant digits.

The voltmeter 110 is an instrument configured to provide digital or analog output that indicates a voltage detected between inputs of the voltmeter 110. The voltmeter 110 generally includes a high resistance between the inputs of the voltmeter 110 when compared to the circuit under test such that measurement of the voltage does not change the voltage substantially. By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. The first port 116 is configured for receiving the first connection lead 120 and the second port 118 is configured for receiving the second connection lead 122.

In some embodiments, the device 100 can, when engaged, have the testing body 102 conduct an electrical current. Further, in some embodiments, the testing body 102 also includes an enclosure that comprises an electrically-insulating layer. As such, the testing body 102 is shielded from any adverse effects of electrical contact. In addition, in some embodiments, the testing body 102 further includes a circuit protector. The circuit protector can be a fuse or a circuit breaker, for example.

Figure 3:
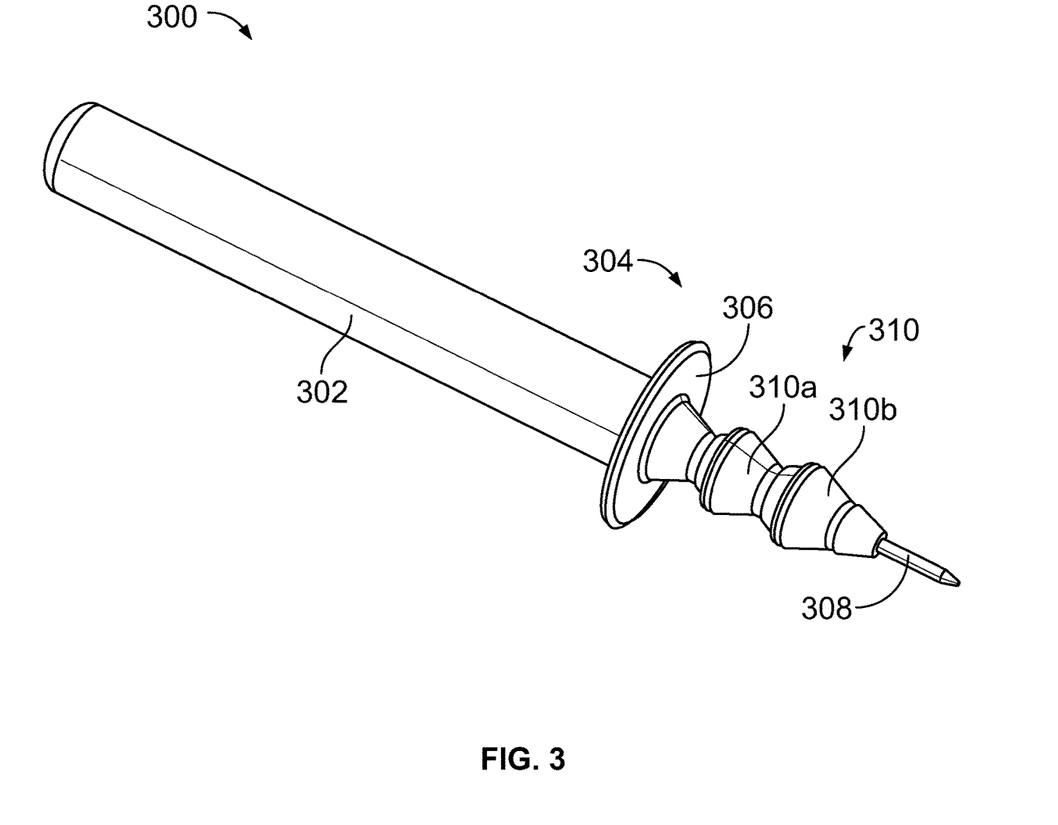
FIG. 3 is a schematic diagram showing aspects of an electrical testing device having a flexible connector for testing a voltage level in an electrical terminal cavity, according to an example embodiment.

FIG. 3 is a schematic diagram showing aspects of an electrical testing device 300 for testing a voltage level in an electrical terminal cavity. The device 300 has a handle 302 configured to attach to a testing body of the electrical testing device that may include any combination of components of the testing body 102 in FIGS. 1 and 2.

The device 300 also may include a test lead 304 for insertion into the electrical terminal cavity. The test lead 304 includes a non-flexible portion 306 configured to be attached to the handle 302, the non-flexible probe 308 configured to be inserted into the electrical terminal cavity, and a flexible connector 310 extending between the non-flexible portion 306 and the non-flexible probe 308 such that the flexible connector 310 has two or more links. Each link of the two or more links are able to articulate in a plurality of directions. For instance, the flexible connector 310 allows for an angle or bend from 0 to 180 degrees or multiple angles and bends such that a probe of the testing device is able to get an improved measurement without having to remove other obstructions or get in its own way, such as 0 to 30 degrees, 30 to 60 degrees, 60 to 90 degrees, 90 to 120 degrees, 120 to 150 degrees, and 150 to 180 degrees.

The two or more links of the flexible connector 310 may be made of a flexible, semi-rigid material, such as a plastic material. In some embodiments, the semi-rigid material is electrically non-conductive, so as to avoid interference of the wires. One example of such a material is acetal copolymer material, which may include polyoxymethylene. Many other plastics and/or other non-conductive electrical materials may be utilized for the flexible connector 310. Further, the flexible connector 310 may be adjustable upon application of a force to the two or more links, such as bending, twisting, or the like.

In some embodiments, the flexible connector 310 houses a flexible electrical wire that electrically-connects the circuit within the handle 302 and the non-flexible probe 308. A contact surface of the non-flexible probe 308 is configured to make contact with the electrical terminal cavity that is desired to be tested. Further, in some embodiments, the non-flexible probe 308 may take the form of a tip. The device 300, in some embodiments, includes a circuit protector, such as a fuse or a circuit breaker that is able to protect the electrical circuit from damage caused by overcurrent, overload, or short circuit by interrupting current flow after protective relays detect a fault.

As shown in FIG. 3, two links (310a and 310b) are able to make up the flexible connector 310, but other configurations with more links are also possible. For example, first link 310a may be configured to sit between the non-flexible portion 306 attached to the handle 302 and the second link 310b. The second link 310b may be configured to sit between the first link 310a and the probe 308. The first link 310a and the second link 310b may be configured to bend the probe 308 with respect to the non-flexible portion 306 attached to the handle 302.

Figure 4:
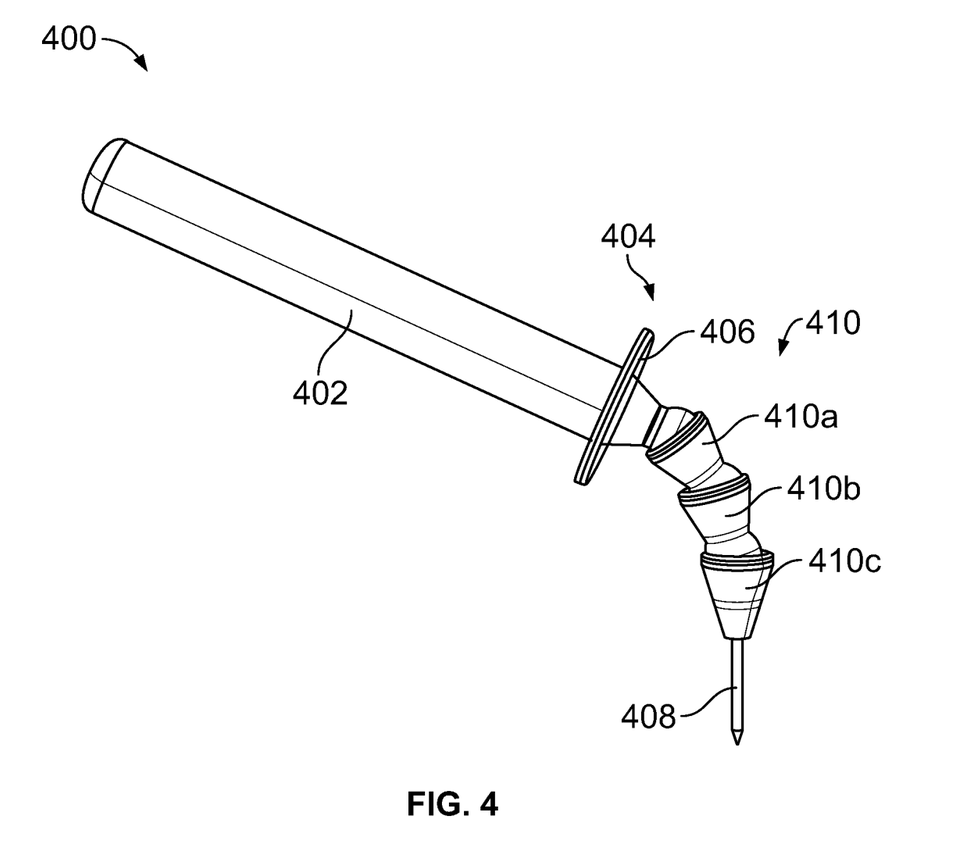
FIG. 4 is a schematic diagram showing aspects of an electrical testing device having a flexible connector for testing a voltage level in an electrical terminal cavity, according to an example embodiment.

For example, in FIG. 4, aspects of an electrical testing device 400 for testing a voltage level in an electrical terminal cavity is shown having a flexible connector 410 having three links (410a, 410b, and 410c) is illustrated. The electrical testing device 400 includes a handle 402 configured to attach to a testing body of the electrical testing device that may include any combination of components of the testing body 102 in FIGS. 1 and 2.

The device 400 also may include a test lead 404 for insertion into the electrical terminal cavity. The test lead 404 includes a non-flexible portion 406 configured to be attached to the handle 402, a non-flexible probe 408 configured to be inserted into the electrical terminal cavity, and the flexible connector 410 extending between the non-flexible portion 406 and the non-flexible probe 408 such that the flexible connector 410 having three links (410a, 410b, and 410c). The three links 410a, 410b, and 410c may take the same form as the links 310a and 310b in FIG. 3, may be of the same or similar material, may require the same application of force to bend, or the like.

Figure 5A:
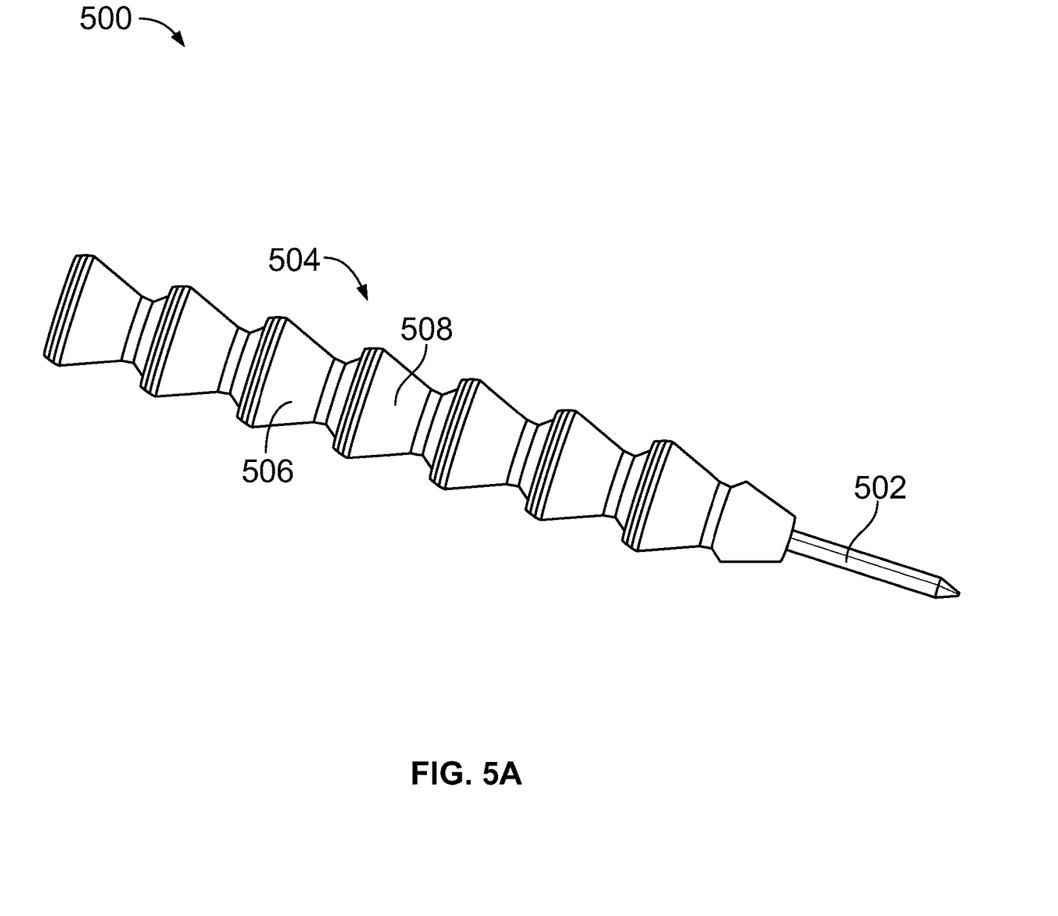
FIG. 5A is a schematic diagram showing a flexible connector of a device for testing a voltage level in an electrical terminal cavity, according to an example embodiment.

FIG. 5A is a schematic diagram showing a flexible connector 500 and a probe 502 for connecting with an electrical terminal with improved access to restricted and/or difficult to reach areas. The flexible connector 500 is made up of two or more links 504. For instance, a first link 506 may be configured to interact with a second link 508 such that the first link 506 and the second link 508 are able to be radially moved in relation to one another in a plurality of directions. This reduces the need for additional and/or attachable components to a testing device to be able to test electrical terminal cavities that may have limited or restricted access (e.g., partially obstructed by other components or located in tight confines), such as attachments that are rigid and only allow for certain test angles of electrical testing devices. The flexible connector 500 allows the probe 502 to be positioned at an appropriate angle for insertion into these electrical terminal cavities without requiring a physical addition to the device, such as by an adapter. Instead, the flexible connector 500 allows for the probe 502 to bend between 0 and 180 degrees from a testing device, or a range of degrees between 0 and 180.

The two or more links 504 may be bent in relation to each other into numerous shapes at multiple bends and angles, as well as into numerous shapes (e.g., an 'S' shape). For instance, the two or more links 504 allow for an angle or bend from 0 to 180 degrees or multiple angles and bends such that a probe of the testing device is able to get an improved measurement without having to remove other obstructions or get in its own way, such as 0 to 30 degrees, 30 to 60 degrees, 60 to 90 degrees, 90 to 120 degrees, 120 to 150 degrees, and 150 to 180 degrees.

In some examples, the flexible connector 500 has a length of between 2 inches and 6 inches. For example, the flexible connecter may be 2 inches long, consist of a series of 3 links, and may allow up to a 45 degree of freedom motion. In other examples, the flexible connector may be 6 inches long, consist of 10 flexible connectors, and may allow up to a 180 degree of freedom motion. Other lengths of the flexible connector 500 are possible.

Figure 5B:
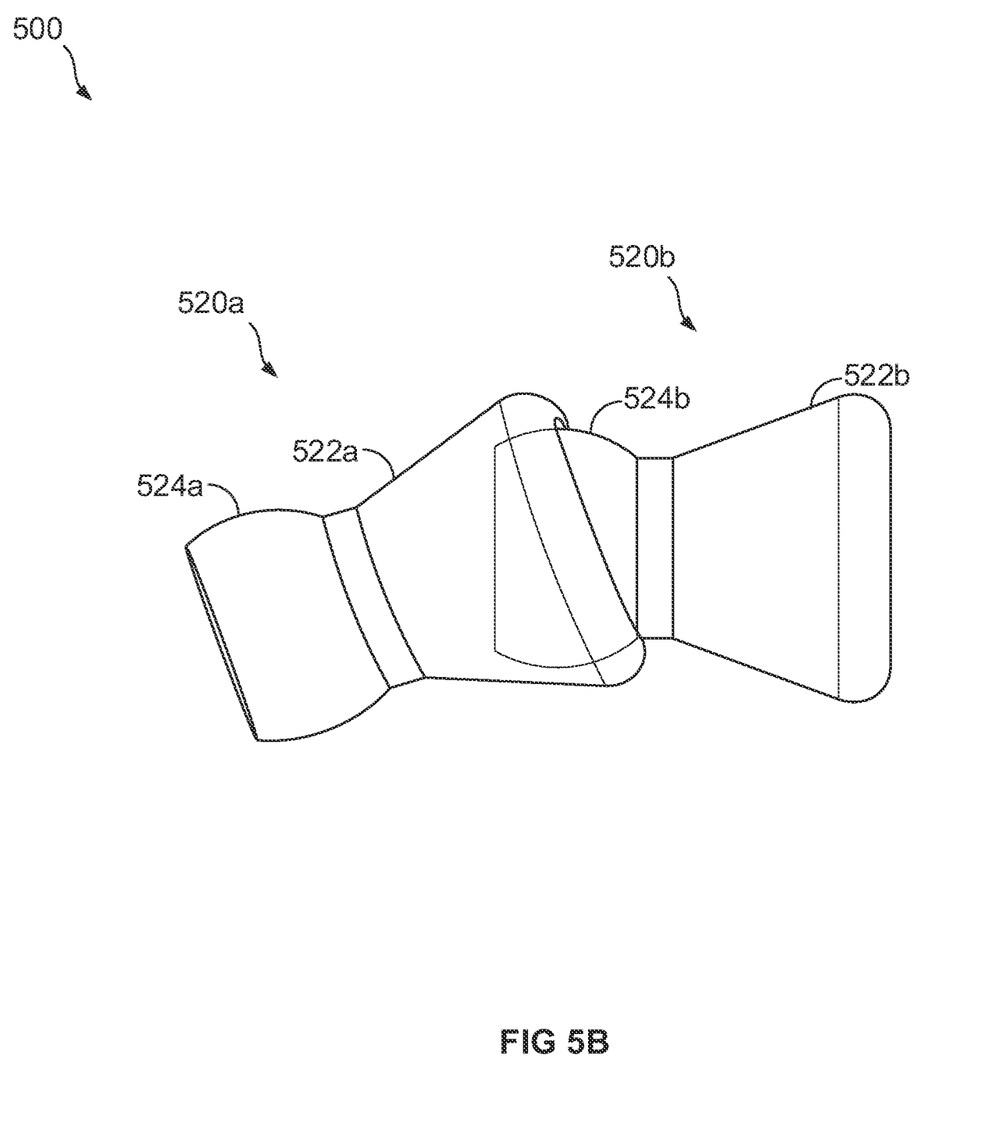
FIG. 5B is a schematic diagram showing links of a flexible connector, according to an example embodiment.

In some examples, such as is shown in FIG. 5B, the flexible connector 500 may include a series of links, such as links 520a and 520b. In these examples, each link (e.g., 520a) in the series of links can be frictionally coupled to an adjacent link (e.g., 520b). Further, each link 520a, 520b may include a conical portion 522a, 522b and a round portion 524a and 524b. The conical portion 522a of the first link 520a can be coupled to a round portion 524b of the adjacent second link 520b. This configuration allows frictional engagement and radial movement of the round portion 524b so as to permit coupling of the first link 520a with the adjacent second link 520b. This configuration also provides sufficient rigidity of the flexible connector 500 to retain its shape when in use, but also allows for an adequate force to be able to shape the flexible connector 500 into a desired position.

Figure 6:
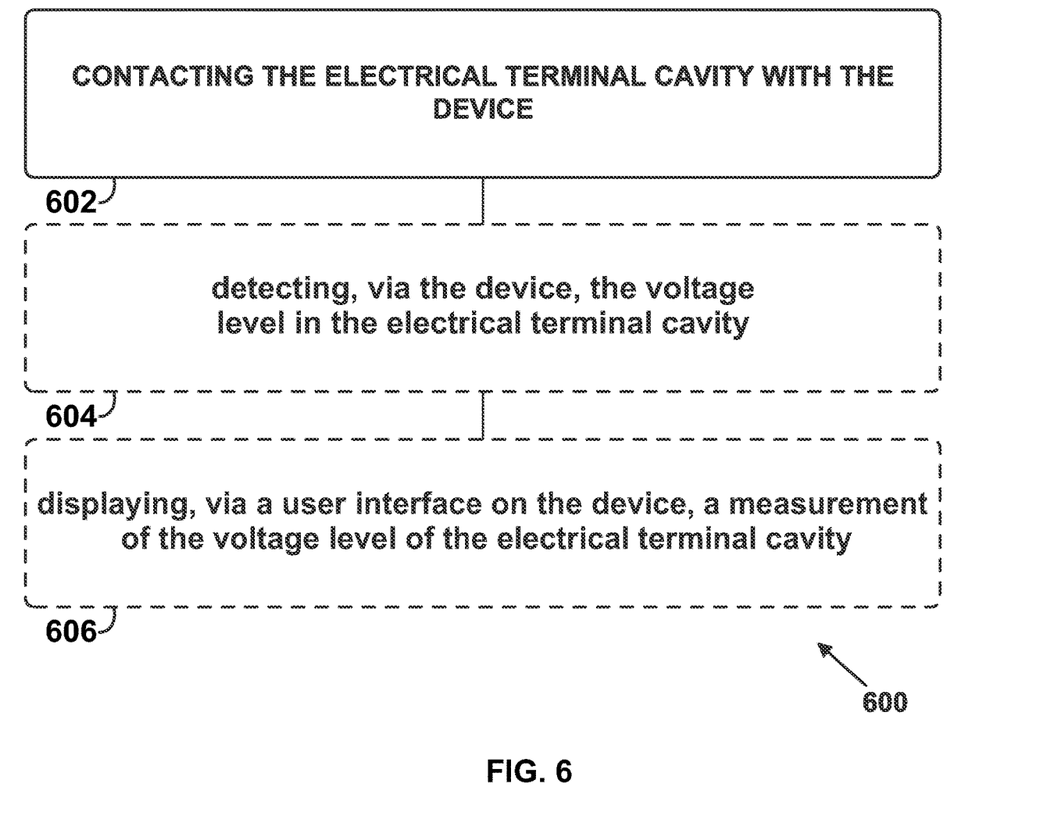
FIG. 6 is a block diagram of a method, according to an example embodiment.

FIG. 6 is a block diagram of a method 600 for operating the device 100. As shown in FIG. 6, the method 600 includes one or more operations, functions, or actions as illustrated by block 602. Any additional blocks may be performed in parallel, and/or in a different order than those described herein. Also, the various blocks may be combined into fewer blocks, divided into additional blocks, and/or removed based upon the desired implementation.

At block 602, the method 600 of using a device for testing a voltage level in an electrical terminal cavity includes contacting the electrical terminal cavity with the device. The device can include any component of FIGS. 1-5, including a testing body and a test lead for insertion into the electrical terminal cavity. The test lead includes a non-flexible portion configured to be attached to the testing body, a non-flexible probe configured to be inserted into the electrical terminal cavity, and a flexible connector extending between the non-flexible portion and the non-flexible probe such that the flexible connector has two or more links, each able to articulate in a plurality of directions. The device also includes a circuit operatively coupled with the probe to sense the voltage level in the electrical terminal cavity.

In some embodiments, the method includes detecting, via the device, the voltage level in the electrical terminal cavity. Further, in some embodiments, the method includes displaying, via a user interface on the device, a measurement of the voltage level of the electrical terminal cavity. In some embodiments, the measurement of the voltage level of the electrical terminal cavity includes at least three significant digits.

In some embodiments, the method includes the two or more links of the device comprising a semi-rigid material. In some embodiments, the flexible connector is adjustable upon application of a force. In some embodiments, the flexible connector houses a flexible electrical wire electrically connecting the circuit within the testing body and the non-flexible probe.

III. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions. For example, an embodiment described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible embodiments: (i) an embodiment including A, but not B and not C, (ii) an embodiment including B, but not A and not C, (iii) an embodiment including C, but not A and not B, (iv) an embodiment including A and B, but not C, (v) an embodiment including A and C, but not B, (v) an embodiment including B and C, but not A, and/or (vi) an embodiment including A, B, and C. For the embodiments including component or function A, the embodiments can include one A or multiple A. For the embodiments including component or function B, the embodiments can include one B or multiple B. For the embodiments including component or function C, the embodiments can include one C or multiple C. In accordance with the aforementioned example and at least some of the example embodiments, "A" can represent a component, "B" can represent a system, and "C" can represent a system.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

What is claimed is:

1. A device for testing a voltage level in an electrical terminal cavity, the device comprising:
   a testing body;
   a test lead for insertion into the electrical terminal cavity, the test lead comprising:
      a non-flexible portion configured to be attached to the testing body;
      a non-flexible probe configured to be inserted into the electrical terminal cavity; and
      a flexible connector extending between the non-flexible portion and the non-flexible probe, wherein the flexible connector comprises two or more links, wherein each of the links comprise a round portion and a conical portion, and wherein each of the links are able to articulate in a plurality of directions; and
   a circuit disposed within the testing body, wherein the circuit is operatively coupled with the test lead such that the circuit is configured to sense the voltage level in the electrical terminal cavity.

2. The device of claim 1, wherein the two or more links comprise a semi-rigid material.

3. The device of claim 2, wherein the flexible connector is adjustable upon application of a force.

4. The device of claim 2, wherein the semi-rigid material is non-conductive.

5. The device of claim 1, wherein the flexible connector houses a flexible electrical wire electrically connecting the circuit within the testing body and the non-flexible probe.

6. The device of claim 1, wherein a contact surface of the non-flexible probe is configured to make contact with the electrical terminal cavity.

7. The device of claim 1, wherein when engaged, the testing body conducts an electrical current.

8. The device of claim 1, wherein the testing body is enclosed in an electrically-insulating layer.

9. The device of claim 1, further comprising a user interface.

10. The device of claim 9, wherein the user interface is configured to display a measurement of the voltage level of the electrical terminal cavity.

11. The device of claim 10, wherein the user interface is configured to display the measurement of the voltage level with at least three significant digits.

12. The device of claim 1, further comprising a circuit protector.

13. The device of claim 12, wherein the circuit protector comprises a fuse or a circuit breaker.

14. A method of using a device for testing a voltage level in an electrical terminal cavity, the method comprising:
   contacting the electrical terminal cavity with the device, wherein the device comprises:
      a testing body;
      a test lead for insertion into the electrical terminal cavity, the test lead comprising:
         a non-flexible portion configured to be attached to the testing body;
         a non-flexible probe configured to be inserted into the electrical terminal cavity; and
         a flexible connector extending between the non-flexible portion and the non- flexible probe, wherein the flexible connector comprises two or more links, wherein each of the links comprise a round portion and a conical portion, and wherein each of the links are able to articulate in a plurality of directions; and
      a circuit disposed within the testing body, wherein the circuit is operatively coupled with the test lead such that the circuit is configured to sense the voltage level in the electrical terminal cavity.

15. The method of claim 14, further comprising:
   detecting, via the device, the voltage level in the electrical terminal cavity.

16. The method of claim 15, further comprising:
   displaying, via a user interface on the device, a measurement of the voltage level of the electrical terminal cavity.

17. The method of claim 16, wherein the measurement of the voltage level of the electrical terminal cavity comprises at least three significant digits.

18. The method of claim 14, wherein the two or more links comprise a semi-rigid material.

19. The method of claim 18, wherein the flexible connector is adjustable upon application of a force.

20. The method of claim 14, wherein the flexible connector houses a flexible electrical wire electrically connecting the circuit within the testing body and the non-flexible probe.

* * * * *